United States Patent
Watanabe et al.

(10) Patent No.: US 10,717,316 B2
(45) Date of Patent: Jul. 21, 2020

(54) COATING FILM TRANSFER TOOL

(71) Applicant: FUJICOPIAN CO., LTD., Osaka-shi, Osaka (JP)

(72) Inventors: Kazuya Watanabe, Osaka (JP); Hiroshi Ozaki, Osaka (JP); Tomio Kaneda, Osaka (JP)

(73) Assignee: FUJICOPIAN CO., LTD., Osaka-shi, Osaka (JP)

( * ) Notice: Subject to any disclaimer, the term of this patent is extended or adjusted under 35 U.S.C. 154(b) by 228 days.

(21) Appl. No.: 15/739,930

(22) PCT Filed: Nov. 30, 2016

(86) PCT No.: PCT/JP2016/085609
§ 371 (c)(1),
(2) Date: Dec. 26, 2017

(87) PCT Pub. No.: WO2018/037578
PCT Pub. Date: Mar. 1, 2018

(65) Prior Publication Data
US 2018/0370275 A1    Dec. 27, 2018

(30) Foreign Application Priority Data
Aug. 20, 2016 (JP) ................... 2016-161586

(51) Int. Cl.
*B43M 11/06* (2006.01)
*B43L 19/00* (2006.01)
(Continued)

(52) U.S. Cl.
CPC ........... *B43M 11/06* (2013.01); *B43K 24/082* (2013.01); *B43L 19/00* (2013.01);
(Continued)

(58) Field of Classification Search
CPC ...... B43M 11/06; B43K 24/082; B43K 29/05; B43L 19/00; B65H 35/0033; B65H 35/0086; B65H 37/007; B65H 2402/44
See application file for complete search history.

(56) References Cited

U.S. PATENT DOCUMENTS

| 6,554,045 B1 | 4/2003 | Lee |
| 2003/0041977 A1 | 3/2003 | Rollion |

(Continued)

FOREIGN PATENT DOCUMENTS

| JP | 11-20389 A | 1/1999 |
| JP | 2007-136959 A | 6/2007 |

(Continued)

OTHER PUBLICATIONS

Sakamoto et al. "JP 2014061676, machine translation", published Apr. 10, 2014 (Year: 2014).*

(Continued)

*Primary Examiner* — Alex B Efta
(74) *Attorney, Agent, or Firm* — Westerman, Hattori, Daniels & Adrian, LLP

(57) ABSTRACT

Provided is a coating film transfer tool comprising an external cassette and an internal cassette housed in the external cassette. The internal cassette includes a supply portion configured to supply transfer tape having a coating film on substrate tape. A pressing and transferring portion is configured to transfer the coating film to a film receiving surface by pressing the transfer tape against the film receiving surface, a take-up portion is configured to take up the (Continued)

substrate tape after the coating film is transferred, and a rotation-in-conjunction mechanism is configured to rotate the supply portion and the take-up portion in conjunction with each other. The external cassette includes a button and an elastic member. The pressing and transferring portion sticks out of the external cassette by the button being pressed, and the pressing and transferring portion retracts into the external cassette by the pressing of the button being stopped.

2 Claims, 6 Drawing Sheets

(51) Int. Cl.
  *B65H 37/00* (2006.01)
  *B65H 35/00* (2006.01)
  *B43K 24/08* (2006.01)
  *B43K 29/05* (2006.01)
  *B32B 41/00* (2006.01)

(52) U.S. Cl.
  CPC ..... *B65H 35/0033* (2013.01); *B65H 35/0086* (2013.01); *B65H 37/007* (2013.01); *B43K 29/05* (2013.01); *B65H 2402/44* (2013.01)

(56) References Cited

U.S. PATENT DOCUMENTS

| 2004/0037611 | A1 | 2/2004 | Rolion |
| 2007/0113987 | A1 | 5/2007 | Ushijima |
| 2016/0332835 | A1* | 11/2016 | Kobashi ................. B43L 19/00 |

FOREIGN PATENT DOCUMENTS

| JP | 2012-200965 A | 10/2012 |
| JP | 2014-51066 A | 3/2014 |
| JP | 2014-61676 A | 4/2014 |
| JP | 2014061676 A * | 4/2014 |

OTHER PUBLICATIONS

International Search Report dated Feb. 21, 2017, issued in counterpart International Application No. PCT/JP2016/085609 in Japanese (3 pages).

Extended (Supplementary) European Search Report dated Feb. 12, 2019, issued in counterpart EP application 16904844.4 (7 pages).

Office Action dated Jun. 2, 2020, issued in counterpart JP Application No. 2018-536037, with English Translation. (8 pages).

* cited by examiner

COATING FILM TRANSFER TOOL

TECHNICAL FIELD

The present invention relates to coating film transfer tools for transferring a coating film for correcting characters, an adhesive coating film for adhesion, a coating film for decoration, etc., to a film receiving surface by pressing the film against the film receiving surface. More particularly the present invention relates to a coating film transfer tool that can be held in an optimum way for transferring a coating film, by a user who has never used the tool and does not well know how to use the tool.

BACKGROUND ART

A coating film transfer tool is typically configured such that a coating film of glue, correction ink, etc., that is applied to the outer side of tape, can be transferred to a film receiving material, such as paper. The tape is wrapped around and supported by a transfer head that sticks out of a case part. Therefore, if pressure applied to the transfer head is not consistent, the transferred coating film may have bends or breaks, and thus, the coating film may not be transferred in a way intended by a user.

The way of holding a coating film transfer tool is a key factor in applying consistent pressure to the transfer head and thereby preventing the transfer head from meandering. An experienced user knows an effective way of holding, and can successfully use a coating film transfer tool. However, a user who is not experienced in using a coating film transfer tool, does not know an effective way of holding, and fails to hold a coating film transfer tool in an effective way. Therefore, an inexperienced user often applies inconsistent pressure to the transfer head, or causes the transfer head to meander, so that the coating film is not transferred as intended.

In order to address the above problems that arise when a coating film transfer tool is not held in an effective way, coating film transfer tools, such as those disclosed in. Patent Literatures 1 and 2, have been conventionally proposed. Patent Literature 1 discloses a transfer tool that is provided with a fingertip contact portion. Patent Literature 2 discloses a coating film transfer tool that is provided with a first recessed portion with which the thumb is made contact, a second recessed portion with which an interdigital portion between the index finger and the thumb is made contact, and a third recessed portion with which the middle finger or the ring finger is made contact.

However, the transfer tools (coating film transfer tools) disclosed in. Patent Literature 1 and Patent Literature 2 can be used to transfer a coating film to a film receiving surface even when a user does not make a fingertip contact with the fingertip contact portion or does not make fingers contact with the respective recessed portions. Therefore, neither of the transfer tools (coating film transfer tools) disclosed in Patent Literature 1 and Patent Literature 2 can limit a user's way of holding to the effective way of holding in transferring the coating film. Therefore, the features of the tools disclosed in Patent Literatures 1 and 2 are insufficient to allow a user who has never used the tools and does not well know how to use the tools to hold the tools in an optimum way for transferring the coating film.

CITATION LIST

Patent Literature

Patent Literature 1: JP 2014-051066A
Patent Literature 2: JP 2012-200965A

SUMMARY OF INVENTION

Technical Problem

It is an object of the present invention to provide a coating film transfer tool that allows a user who has never used the tool and does not well brow how to use the tool to hold the tool in an optimum way for transferring a coating film so that the coating film can be transferred in a way intended by the user without bends or breaks in the transferred coating film.

Solution to Problem

A coating film transfer tool according to a first aspect of the present invention includes an external cassette and an internal cassette housed in the external cassette. The internal cassette includes a supply portion configured to supply transfer tape having a coating film on substrate tape, a pressing and transferring portion configured to transfer the coating film to a film receiving surface by pressing the transfer tape against the film receiving surface, a take-up portion configured to take up the substrate tape after the coating film is transferred, and a rotation-in-conjunction mechanism configured to rotate the supply portion and the take-up portion in conjunction with each other. The external cassette includes a button and an elastic member. The pressing and transferring portion sticks out of the external cassette by the button being pressed and moved into the external cassette, and the pressing and transferring portion retracts into the external cassette due to an action of the elastic member by the pressing, of the button being stopped. The button is provided on an upper surface of the coating film transfer tool, where a downward direction of the coating film transfer tool is defined as a pressing direction of the coating film transfer tool in such a pressing position that the pressing and transferring portion is pressed against the film receiving surface in order to transfer the coating film. In a case that a fore-and-aft direction of the coating film transfer tool is defined as a direction in which the pressing and transferring portion sticks out, and a front end of the coating film transfer tool is defined as a leading end of the pressing and transferring portion in a situation where the button is in an all-the-way-down position, the all-the-way-down position being reached when the button is pressed all the way down into the external cassette, a value obtained by dividing a distance between the front end and a middle point in the fore-and-aft direction of the button in the all-the-way-down position by a full length in the fore-and-aft direction of the coating film transfer tool is not more than 0.35. The coating film transfer tool further includes an external force action reduction portion configured to reduce an action on the button of an external force that acts on the pressing and transferring portion and pushes the pressing and transferring portion back into the external cassette in the situation where the button is in the all-the-way-down position. The external force action reduction portion includes an engagement portion provided in the button. The engagement portion is engaged with the internal cassette Its when the button is being pressed, and is disengaged from the internal cassette by an action of the elastic member when the pressing of the button is stopped.

A coating film transfer tool according to a second aspect of the present invention is the coating film transfer tool according to the first aspect in which a movement shaft provided in the internal cassette is configured to move in an elongated hole provided in the button, or a movement shaft provided in the button is configured to move in an elongated hole provided in the internal cassette when the button is pressed, and the internal cassette is thereby configured to move in the external cassette so that the pressing and transferring portion sticks out of the external cassette.

A coating film transfer tool according to a third aspect of the present invention is the coating film transfer tool according to the second aspect in which the external force action reduction portion further includes a shaft holding portion configured to engage with the movement shaft. The shaft holding portion includes a cut portion. The cut portion extends from the elongated hole in a direction in which the cut portion is engaged with the movement shaft by an external force that pushes the pressing and transferring portion back into the external cassette when the button is in the all-the-way-down position.

Advantageous Effects of Invention

According to the first aspect, the button for pressing the external cassette inward is provided on the upper surface at a position close to the front end, in the situation where the coating film transfer tool is in such a pressing position that the pressing and transferring portion is pressed against the film receiving surface. In addition, unless the button is kept pressed, the pressing mid transferring portion retracts inwardly, and therefore, the coating film cannot be transferred. Therefore, the coating film cannot be transferred unless a user presses the coating film transfer tool using a finger at a position in the vicinity of the pressing and transferring portion where it is easy to apply pressure to the pressing and transferring portion, in a direction in which the coating film transfer tool is held. Thus, according to the first aspect, provided is a button that is provided at a position suitable for holding the coating film transfer tool and applying pressure to the pressing and transferring portion, and is configured to be pressed in a direction suitable for holding the coating film transfer tool and applying pressure to the pressing and transferring portion. Unless the button is kept pressed, the pressing and transferring portion retracts inwardly, and therefore, the coating film cannot be transferred. Therefore, even a user who has never used the coating film transfer tool and does not well know how to use the coating film transfer tool can hold the coating film transfer tool in an optimum way for transferring the coating film. Therefore, the coating film transfer tool can be used to transfer the coating film in a way intended by a user without bends or breaks in the transferred coating film. Furthermore, an external force that pushes the pressing and transferring portion back to the inside is less likely to act on the button, and therefore, a situation can be avoided in which the button is unintentionally pushed back by a force that presses the pressing and transferring portion against the film receiving surface, so that the coating film cannot be transferred.

DESCRIPTION OF EMBODIMENTS

Figure 1A:
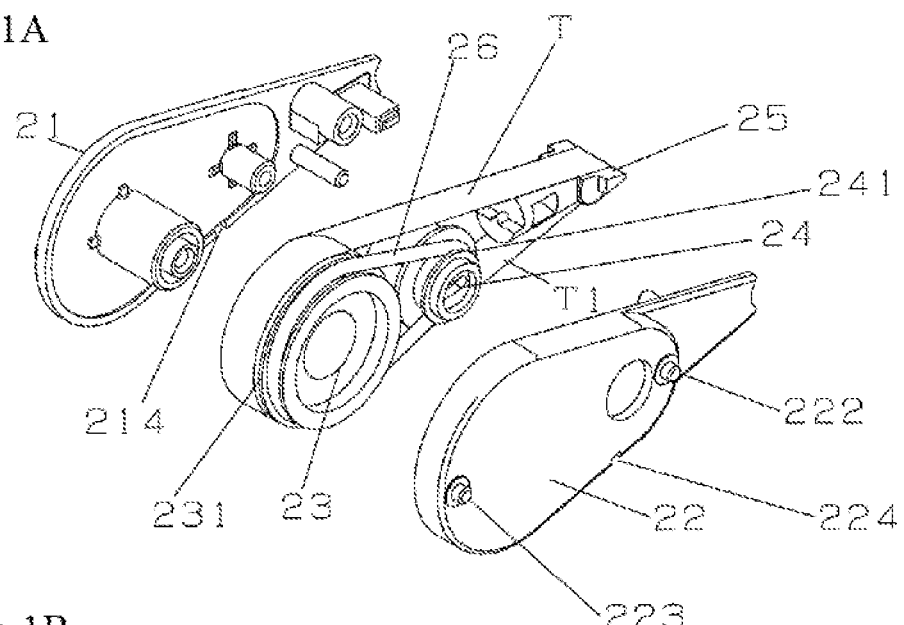
FIGS. 1A through 1C are diagrams showing an internal cassette in a coating film transfer tool according to a first embodiment of the present invention.
Figure 1B:
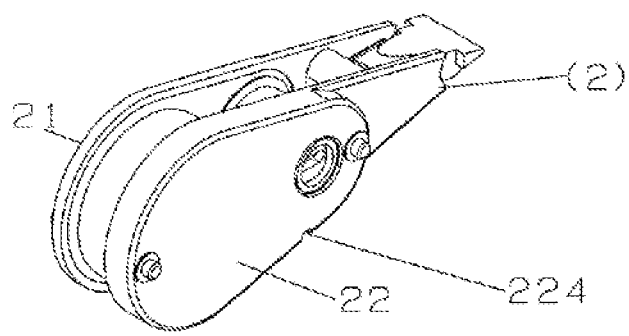
Figure 1C:
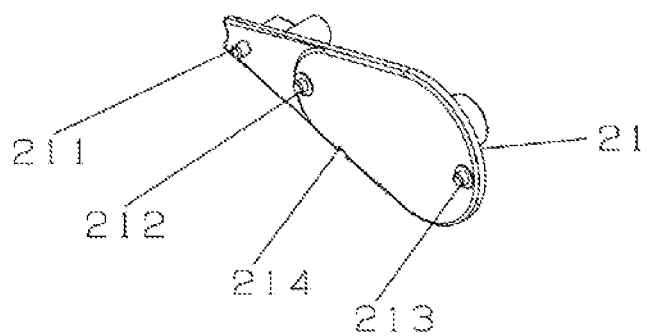

FIG. 5 and FIGS. 6A through 6C show an overall view of a coating film transfer tool A according to a first embodiment of the present invention. FIGS. 1A through 1C show a view of an internal cassette 2 in the coating film transfer tool A of the first embodiment.

The coating film transfer tool A is configured such that transfer tape T including substrate tape T1 and a coating film provided thereon is supplied or unwound from a supply portion, the transfer tape T is pressed by a pressing and transferring portion so that the coating film is transferred to a film receiving surface, and thereafter, the substrate tape T1 is taken up or wound. The coating film transfer tool A is also configured such that a supply core and a take-up core rotate in conjunction in such a manner that a length of the substrate tape T1 that is taken up is longer than a length of the transfer tape T that is supplied, whereby suitable tension is applied to the transfer tape T so that the transfer tape T does not become loose.

An external cassette 1 that is a housing portion of the coating film transfer tool A includes at least a case 11, a cover 12, and a button 13. The external cassette 1, which is a housing that has a space therein, houses the internal cassette 2 in the internal space. When the button 13 of the external cassette 1 is pressed, the pressing and transferring portion 25 of the internal cassette 2 sticks out of the external cassette 1, so that the coating film can be transferred flour the transfer tape T.

FIGS. 1A through IC show the internal cassette 2. FIG. 1A is a diagram showing a configuration of parts of the internal cassette 2, in which an inner case 21 and an inner cover 22 are separated from the other parts, and the other parts are incorporated in the internal cassette 2. FIG. 1B is a diagram showing the internal cassette 2 after being completely assembled. FIG. 1C is a diagram showing the inner case 21 alone as viewed from the opposite side thereof from that shown in FIG. 1A. As shown in FIGS. 1A through 1C, in the internal cassette 2, a supply core 23 and a take-up core 24 are rotatably supported by the housing including the inner case 21 and the inner cover 22. The transfer tape T is wound around the supply core 23, which forms a supply portion that supplies or unwinds the transfer tape T. The take-up core 24 serves as a take-up portion that takes up or winds the substrate tape T1 after the coating film is transferred. A transfer head 25 sticks out of the internal cassette 2 to form a pressing and transferring portion that transfers the coating film from the transfer tape T to the film receiving surface by pressing the transfer tape T against the film receiving surface.

In the internal cassette 2, the inner case 21 is fixed to the inner cover 22 by pressing and inserting a pin provided in one of the inner case 21 and the inner cover 22 into a hole provided in the other so that the inner case 21 and the inner cover 22 are joined together. A method for fixing the inner case 21 to the inner cover 22 is not limited to such a joining method, and may be any suitable method.

The supply core 23 and the take-up core 24 are provided with pulley portions 231 and 241, respectively. An O-ring 26 is wrapped around and supported by the pulley portions 231 and 241. The O-ring 26 allows the supply core 23 and the take-up core 24 to rotate in conjunction with each other. In the internal cassette 2, the outer diameter of the supply core 23, around which the transfer tape T is wound, and the outer diameter of the take-up core 24, around which the substrate tape T1 is wound, are set such that the length of the substrate tape T1 that is taken up is longer than the length of the transfer tape T that is supplied. The O-ring 26 slips on the pulley portion 241 of the take-up core 24, which allows the supply core 23 and the take-up core 24 to rotate in conjunction in such a manner as to accommodate the difference between the length of the transfer tape T that is supplied and the length of the substrate tape T1 that is taken up. As a result, suitable tension is applied to the transfer tape T, so that the transfer tape T does not become loose. Although, in the internal cassette 2, an O-ring is used as an rotation-in-conjunction mechanism for the cores, the rotation-in-conjunction mechanism of the coating film transfer tool according to the present invention is not limited to an O-ring, and may be any suitable rotation-in-conjunction mechanism, such as a gear or a friction wheel.

The internal cassette 2 is assembled as follows. Initially, the transfer head 25, and the supply core 23 with the transfer tape T and the take-up core 24 attached thereto, are incorporated into the inner case 21 with a route for the transfer tape T being formed. Next, the O-ring 26 is wrapped around the respective pulley portions 231 and 241 of the supply core 23 and the take-up core 24. Finally, the inner cover 22 is attached to the inner case 21.

In the coating film transfer tool A, the internal cassette 2 is housed in the external cassette 1 such that three column-shaped movement shafts provided in the inner case 21 and two column-shaped movement shafts provided in the inner cover 22 allow the internal cassette 2 to slide in the external cassette 1. As shown in FIGS. 1A through 1C, the inner case 21 is provided with three movement shafts 211, 212, and 213, which are arranged in that order with the movement Shaft 211 being closest to the transfer head 25. The inner cover 22 is provided with movement shafts 222 and 223 that are disposed at positions corresponding to those of the two movement shafts 212 and 213 of the inner case 21.

Figure 6A:
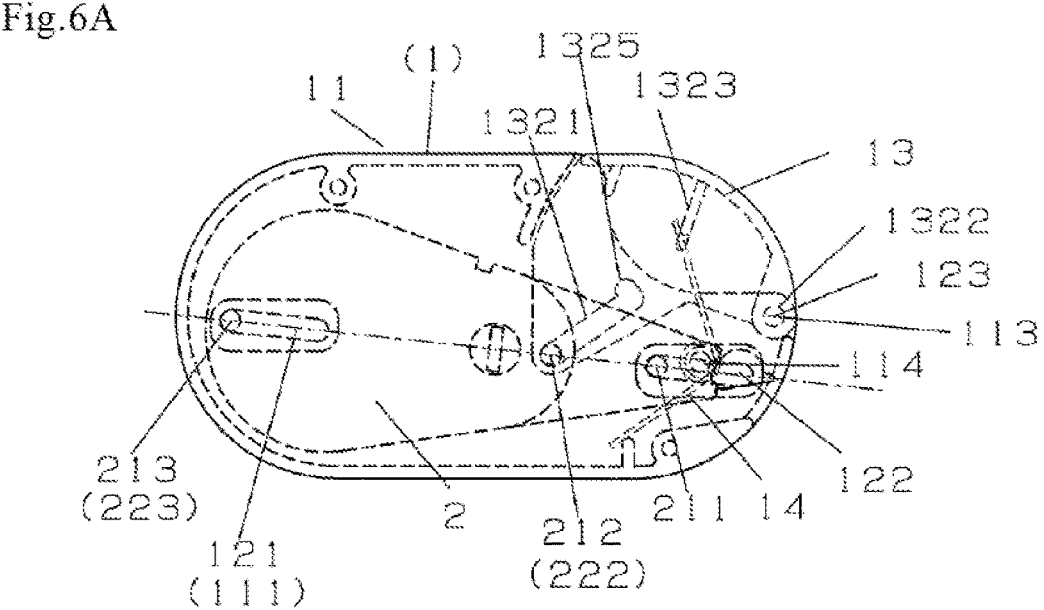
FIGS. 6A through 6C are diagrams showing arrangements in which a transfer head sticks out and retracts when the button is being pressed, in the coating film transfer tool according to the first embodiment of the present invention.
Figure 6B:
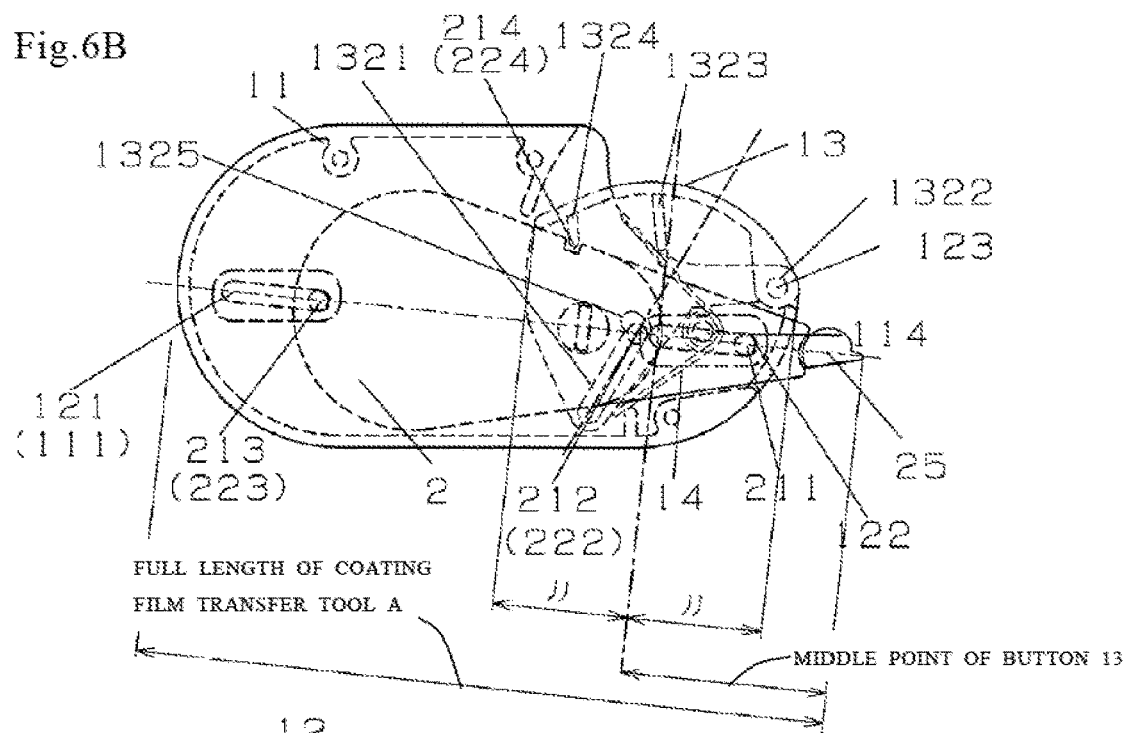
Figure 6C:
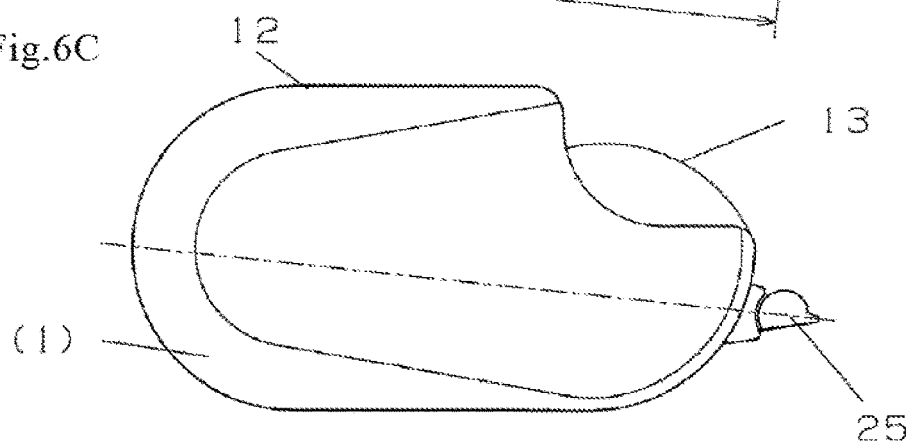

As shown in FIGS. 6A through 6C, the external cassette 1, in which the internal cassette 2 is housed, includes four parts, namely the case 11, the cover 12, the button 13, and a torsion spring 14. The torsion spring 14 is an elastic member that applies an elastic force to the button 13 so that the button 13 is pushed back to the outside in a situation where the button 13 has been pressed and moved from the outside into the inside of the external cassette 1. Therefore, for example, if an elastic member, etc., that is integrally provided in the case and/or the cover, can be used to apply an elastic force to the button 13 so that the button 13 can be pushed back, it is not essential to use the torsion spring 14.

Figure 2:
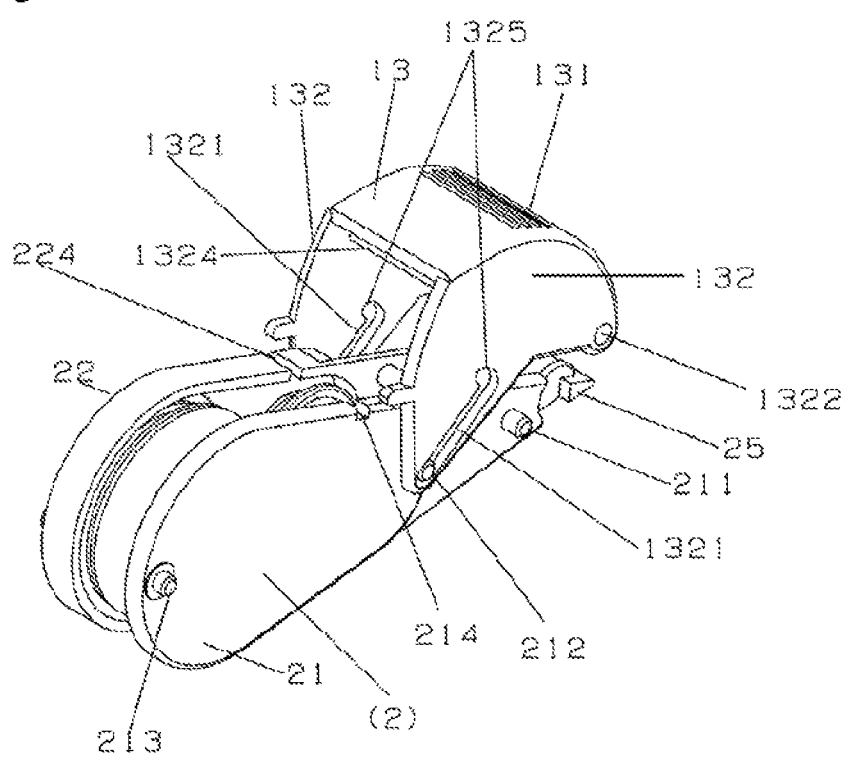
FIG. 2 is a diagram showing an arrangement in which the internal cassette is attached to a button when the internal cassette is attached to an external cassette in the coating film transfer tool according to the first embodiment of the present invention.

Before the internal cassette 2 is attached to the external cassette 1, the button 13 is attached to the internal cassette 2 as shown in FIG. 2. The button 13 includes a press plate 131 that is a portion which is exposed to the outside of the external cassette 1 and is pressed by a user, and two guide plates 132 protruding substantially in parallel from the opposite end portions of the press plate 131. The two guide plates 132 are provided with elongated guide holes 1321 facing each other. The button 13 is also provided with pivot holes 1322 into Which pivot shafts 113 and 123 of the case 11 and the cover 12 are inserted and around which the button 13 rotates when the button 13 is pressed from the outside.

The distance between the two guide plates 132 of the button 13 is increased by the two guide plates 132 being elastically deformed, and the internal cassette 2 is inserted between the two guide plates. Also, the movement shafts 212 and 222 of the internal cassette are attached to or inserted into the elongated guide holes 1321. The distance between the two guide plates 132 is slightly greater than the width of the internal cassette 2. The widths of the guide holes 1321 are slightly greater than the diameters of the movement shafts 212 and 222. Therefore, the internal cassette 2 is allowed to slide along the guide holes 1321 relative to the button 13.

Figure 3A:
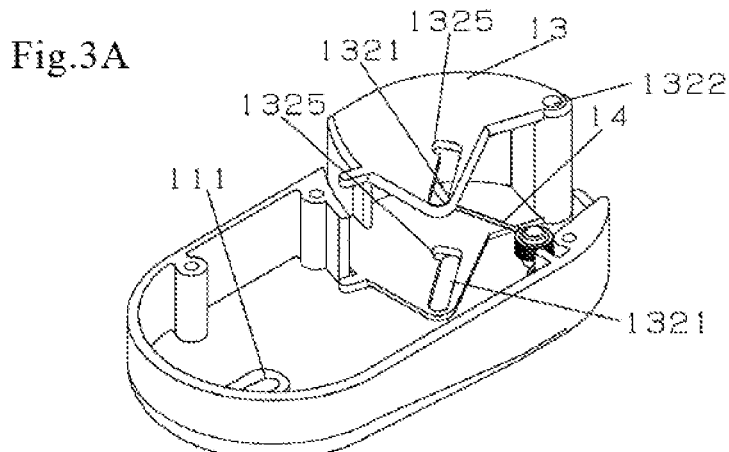
FIGS 3A. and 3B are diagrams showing an arrangement in which a torsion spring is attached to a case, and the button, not attached to the internal cassette, is attached to the case, for the purpose of indicating a positional relationship therebetween clearly, in the coating film transfer tool according to the first embodiment of the present invention.
Figure 3B:
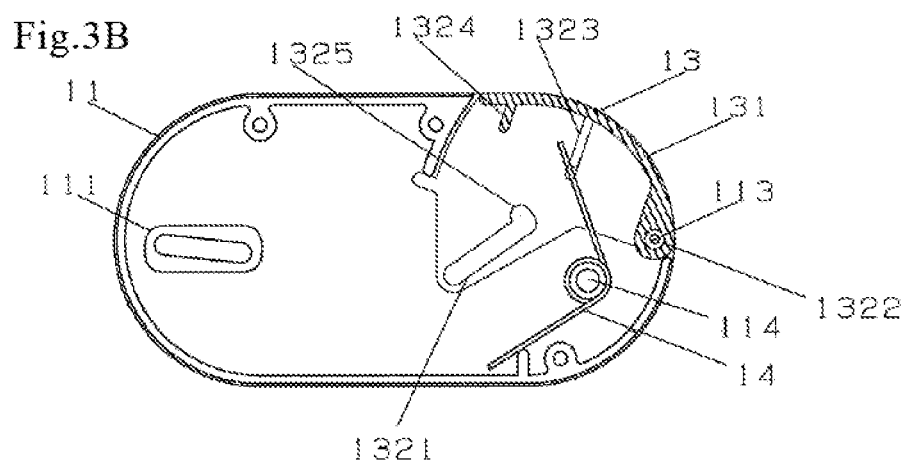
Figure 4:
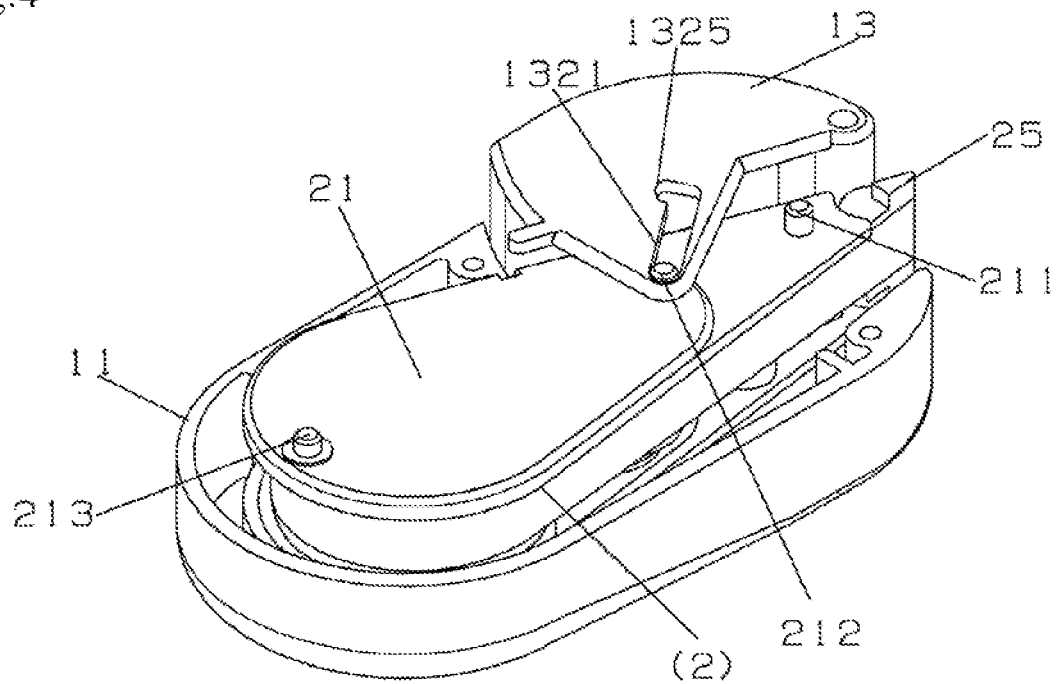
FIG. 4 is a diagram showing an arrangement in which the torsion spring is attached to the case, and the internal cassette with the button attached thereto is attached to the case, in the coating film transfer tool according to the first embodiment of the present invention.

As shown in FIGS. 3A and 3B, the inner diameter of the coil portion of the torsion spring 14 is set to a spring bearing shaft 114 of the case 11. Next, the internal cassette 2 with the button 13 attached thereto is attached to the case 11. The resultant structure is shown in FIG. 4. FIGS. 3A and 3B is a diagram showing an arrangement in which the button 13, not attached to the internal cassette 2, is attached to the case 11, for the purpose of indicating a positional relationship between the torsion spring 14 and the button 13 clearly (during actual assembly, the internal cassette 2 with the button 13 attached thereto is attached to the case 11). FIG. 3A is a perspective view showing an arrangement in which the button 13, not attached to the internal cassette 2, is attached to the case 11. FIG. 3B is a cross-sectional view of an upper side of the case 11 in the arrangement of FIG. 3A, as viewed from above the case 11. When the internal cassette 2 with the button 13 attached thereto is attached to the case 11 with the torsion spring 14 attached thereto, the movement shaft 223 of the inner cover 22 is attached to or inserted into a guide groove 111 that is in the shape of an elongated hole and is provided in the case 11. Also, the pivot shaft 113 of the case 11 is attached to or inserted into the pivot hole 1322 of the button 13. At this time, an end portion of the torsion spring 14 attached to the case 11 is in contact with a press rib 1323 that is provided inside the press plate 131 of the button 13. As a result, the elastic force of the torsion spring 14 is applied to the button 13 in a direction in which the button 13 is pushed out of the case 11.

Figure 5:
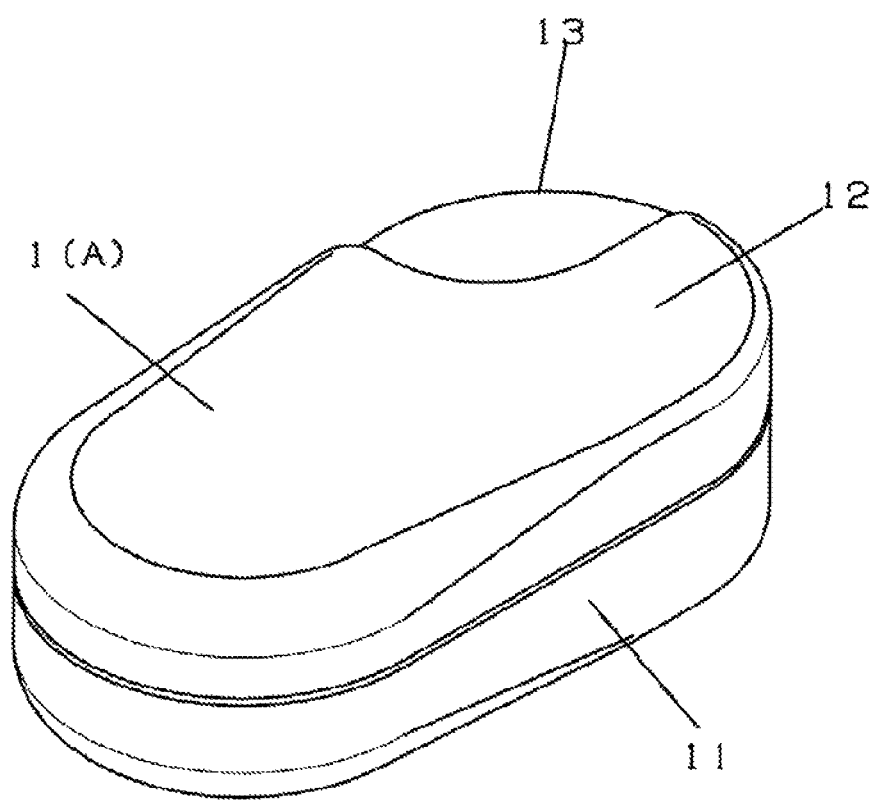
FIG. 5 is a diagram showing an arrangement in which the assembly of the coating film transfer tool according to the first embodiment of the present invention is completed by attaching a cover to the case.

Finally, the cover 12 is attached to the case 11 with the internal cassette 2 attached thereto. Thus, the assembly of the coating film transfer tool A shown in FIG. 5 is completed. When the cover 12 is attached, the movement shaft 213 of the internal cassette 2 is attached to or inserted into a guide groove 121 that is in the shape of an elongated hole and is provided in an inner wall of the cover 12, and the movement shaft 211 of the internal cassette 2 is attached to or inserted into a guide groove 122 that is in the shape of an elongated hole and is provided in the inner wall of the cover 12. Also, the pivot shaft 123, which is provided on the inner wall of the cover 12, is attached to or inserted into the pivot hole 1322 of the button 13. The widths of the guide grooves 121, 122, and 111 are slightly greater than the outer diameters of the movement shafts 213, 211, and 223, respectively, and the guide grooves 121, 122, and 111 are parallel to each other. This allows the internal cassette 2 to slide along these three guide grooves relative to the case 11 and the cover 12.

In the coating film transfer tool A, the case 11 is fixed to the cover 12 by pressing and inserting a pin provided in one of the case 11 and the cover 12 into a hole provided in the other so that the case 11 and the cover 12 are joined together. A method for fixing the case 11 to the cover 12 is not limited to such a joining method, and may be any suitable method.

When the button 13 is pressed and moved into the inside, the button 13 rotates around the pivot shafts 113 and 123 provided in the case 11 and the cover 12, so that the coating film transfer tool A is put into a state shown in FIG. 6B and FIG. 6C. When the button 13 rotates around the pivot shafts 113 and 123, the guide holes 1321 provided in the button 13 also rotate around the pivot shafts 113 and 123. The movement shafts 212 and 222 of the internal cassette 2 inserted in the guide holes 1321 move in the guide holes 1321 relative to the guide holes 1321. Also, the movement shafts 211 and 213 of the internal cassette 2 are inserted in the guide grooves 122 and 121, respectively, of the cover 12, and the movement shaft 223 is inserted in the guide groove 111 of the case 11. Furthermore, the guide grooves 122, 121, and 111 are in the shape of an elongated hole the longitudinal direction of which is a direction in which the transfer head 25 sticks out and retracts relative to the external cassette 1. Therefore, the internal cassette 2 is allowed to move relative to the external cassette 1 only in the direction in which the transfer head 25 sticks out and retracts relative to the external cassette 1. Therefore, when the button 13 is pressed into the inside, only a component of the force transferred from the guide holes 1321 to the movement shafts 212 and 222 of the internal cassette 2, the direction of which is the direction in the transfer head 25 sticks out and retracts relative to the external cassette 1, acts on the movement of the internal cassette 2. As a result, the internal cassette 2 moves in the direction in which the transfer head 25 sticks out and retracts relative to the external cassette 1.

Although, in the coating film transfer tool A, the button 13 is configured to rotate around the pivot shafts 113 and 123, the button 13 of the present invention is not limited to such a rotatable button. The button 13 of the present invention may be in any suitable form, such as that in which the button 13 is configured to he translated in a pressing direction. Also, in the coating film transfer tool A, the driving force is transferred from the button 13 to the internal cassette 2 by a combination of the guide holes 1321 that are an elongated hole provided in the button 13, and the movement shafts 212 and 222 that are a column provided in the internal cassette 2. However, the driving force transfer method of the present invention may be any suitable method in addition to the combination of the columns provided in the button and the elongated holes provided in the internal cassette. Also, in the coating film transfer tool A, the sliding mechanism for the internal cassette 2 and the external cassette 1 is a combination of the movement shafts that are a column provided in the internal cassette 2 and the guide grooves that are an elongated hole provided in the external cassette 1. However, the sliding mechanism of the present invention may be any mechanism that, allows the internal cassette 2 to smoothly slide in the external cassette.

The button 13 is rotated until the movement shafts 212 and 222 of the internal cassette are in contact with end portions of the guide holes 1321 and thereby is pressed into the external cassette 1. When the movement shafts 212 and 222 are in contact with the end portions of the guide holes 1321, a stopper rib 1324 that is an engagement portion provided in the button 13 is engaged with engagement grooves 214 and 224 that are provided in the inner case 21 and the inner cover 22, respectively, of the internal cassette 2. The stopper rib 1324 is engaged with the engagement grooves 214 and 224, with the transfer head 25 sticking out of the external cassette 1. When the stopper rib 1324 is engaged with the engagement grooves 214 and 224, a force that pushes the transfer head 25 back to the inside is applied to the stopper rib 1324. The force that pushed the transfer head 25 back to the inside is applied to the stopper rib 1324 and the engagement grooves 214 and 224, and therefore, the stopper rib 1324 and the engagement grooves 214 and 224 serve as an external force action reduction portion that reduces the action on the button 13 of a reaction force to a force that presses the transfer head 25 against the film receiving surface. Therefore, the provision of the stopper rib 1324 and the engagement grooves 214 and 224 prevents the transfer head 25 from being unintentionally pushed back into the external cassette 1 by the reaction force from the film receiving surface that acts on the transfer head 25. In other words, the external force that pushes the pressing and transferring portion back to the inside is less likely to act on the button 13, and therefore, a situation can be avoided in which the button 13 is unintentionally pushed back by the force that presses the pressing and transferring portion against the film receiving surface, so that the coating film cannot be transferred. Therefore, even when a user does not press the button 13 with great force, the coating film can be stably transferred.

To elongate an engagement region of the stopper rib 1324 with the engagement grooves 214 and 224 is effective in, ensuring the effect of reducing the action on the button 13 of the reaction force to a force that presses the transfer head 25, which is a pressing and transferring portion, against the film receiving surface (hereinafter referred to as the reaction force reduction effect). The engagement region refers to a length over which the stopper rib 1324 overlaps the engagement grooves 214 and 224 when the stopper rib 1324 is engaged with the engagement grooves 214 and 224. However, if the engagement region is excessively long, the stopper rib 1324 may not be smoothly disengaged from the engagement grooves 214 and 224 when the pressing of the button 13 is stopped. In other words, even when a user stops pressing the button 13, the button 13 may not be moved back, and the transfer head 25 may be kept sticking out. On the other hand, if the engagement region is excessively short, the disengagement may occur, so that the reaction force reduction effect may be insufficient, and the engagement portion may be easily damaged. For such a reason, the length of the engagement region is preferably not less than 1.0 mm and not more than 2.5 mm, more preferably not less than 1.5 mm and not more than 2.0 mm.

In order to further ensure the reaction force reduction effect without causing other problems, such as non-smooth disengagement of the stopper rib 1324 from the engagement grooves 214 and 221, an additional external force action reduction portion having another structure is preferably used. A preferable example of such an additional external force action reduction portion having another structure is cut portions 1325. The cut portions 1325 are provided by extending from the elongated holes 1321 in a direction in which the cut portions 1325 are engaged with the movement shafts 212 and 222 by an external force that pushes the transfer head 25 back into the external cassette 1 when the button 13 is pressed all the way down into the external cassette 1.

The cut portions 1325 have substantially the same shapes as the outer shapes of the movement shafts 212 and 222, and are preferably slightly larger than the outer shapes of the movement shafts 212 and 222. When the transfer head 25 is pressed against the film receiving surface, a reaction force to a three that presses the film receiving surface acts on the transfer head 25. The reaction force serves as a force acting in a direction in which the transfer head 25 is pushed back into the external cassette 1. In the coating film transfer tool A, the button 13 is provided with the cut portions 1325, and therefore, at the time when the transfer head 25 is slightly pushed back into the external cassette 1, the cut portions 1325 are engaged with the movement shafts 212 and 222. The engagement of the cut portions 1325 with the movement shafts 212 and 222 stops the movement shafts 212 and 222 from moving in the guide holes 1321. In order to allow the reaction force acting on the transfer head 25 to affect the button 13, the movement shafts 212 and 222 need to move in the guide holes 1321. Therefore, the provision of the cut portions 1325 can further ensure the reaction force reduction effect.

The cut portions 1325 are engaged with the movement shafts 212 and 222 by the external force itself acting on the transfer head 25. Therefore, the cut portions 1325 are disengaged from the movement shafts 212 and 222 only by stopping pressing the transfer head 25 against the film receiving surface. Therefore, there is not the possibility that the cut portions 1325 cannot be smoothly disengaged from the movement shafts 212 and 222 like the stopper rib 1324 and the engagement grooves 214 and 224.

An end portion of the torsion spring 14 attached to the case 11 is in contact with the press rib 1323 provided inside the press plate 131 of the button 13, which allows the elastic force of the torsion spring 14 to be applied to the button 13 in a direction in which the button 13 is pushed out of the case 11. Therefore, when the pressing of the button 13 is stopped, the button 13 rotates around the pivot shafts 113 and 123 provided in the case 11 and the cover 12, and therefore, the stopper rib 1324 is first disengaged from the engagement grooves 214 and 224. The disengagement of the stopper rib 1324 from the engagement grooves 214 and 224 allows the internal cassette 2 to move in a direction in which the transfer head 25 retracts into the external cassette 1. The button 13 rotates until the movement shafts 212 and 222 are in contact with end portions of the guide holes 1321 and therefore the button 13 is not allowed to rotate any more. When the button 13 is rotated by the elastic force of the torsion spring 14, the guide holes 1321 provided in the button 13 also rotates around the pivot shafts 113 and 123. The movement shafts 212 and 222 of the internal cassette inserted in the guide holes 1321 are moved in the guide holes 1321 relative to the guide holes 1321. Therefore, as the opposite of the situation where the button 13 is pressed, the transfer head 25 retracts into the external cassette 1. As a result, the coating film transfer tool A is returned to the state that exists before the button 13 is pressed.

Figure 7A:
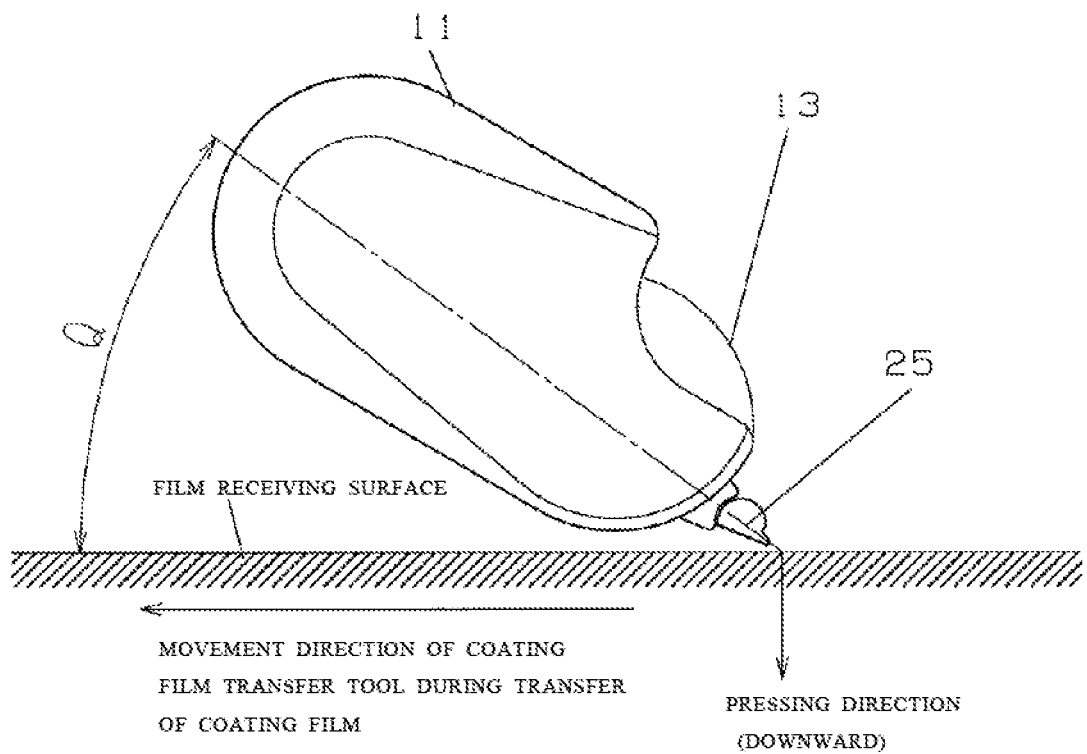
FIGS. 7A and 7B are diagrams showing a pressing position of the coating film transfer tool according to the first embodiment of the present invention in which the tool is pressed against a film receiving surface.
Figure 7B:
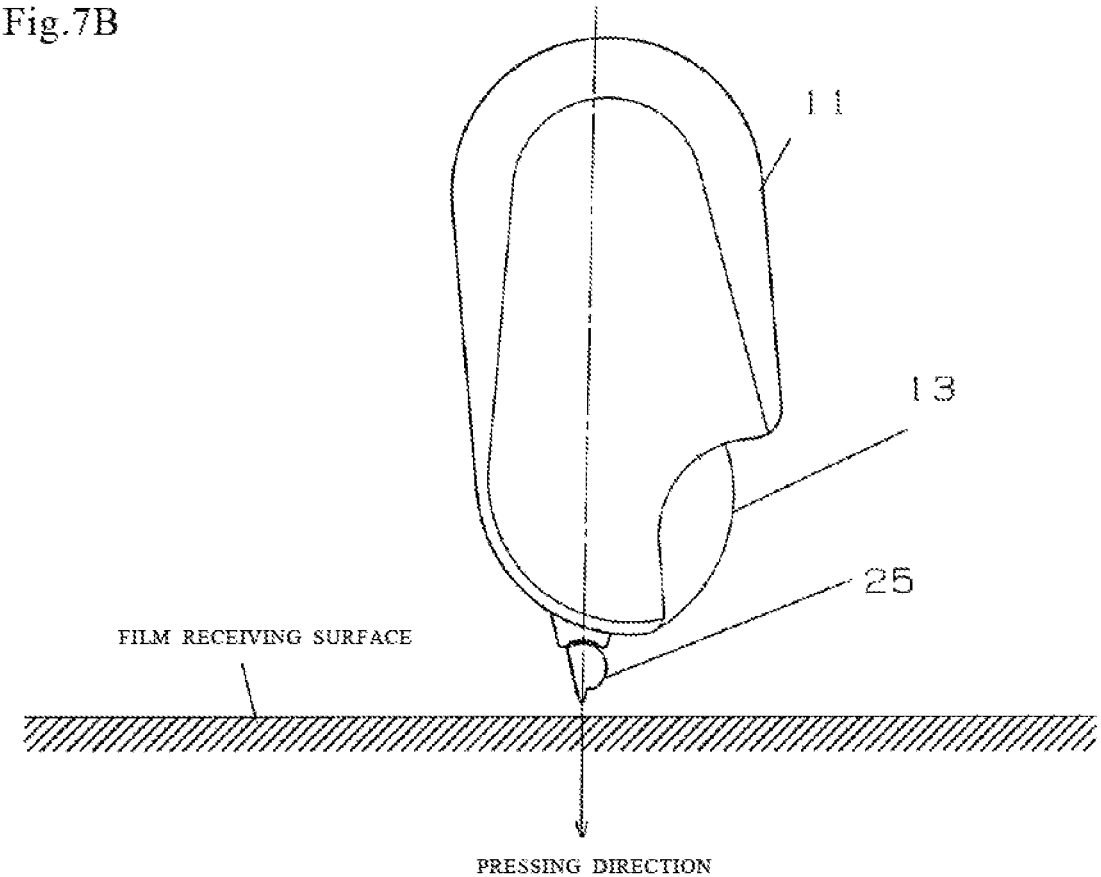

As shown in FIG. 7A, in the coating film transfer tool A, the button 13 is preferably provided on an upper surface of the coating film transfer tool A, assuming that a downward direction of the coating film transfer tool A is defined as a pressing direction of the coating film transfer tool. A in such a pressing position that the transfer head 25, which is a pressing and transferring portion for transferring the coating film, is pressed against the film receiving surface. As shown in FIG. 7(b)FIG. 7B. the coating film transfer tool A may be used with the transfer head 25 standing perpendicularly to the film receiving surface. However, as used herein, the pressing position refers to a position that is taken, as shown in FIG. 7A, with the transfer head 25 being inclined at an acute angle Q shown in FIG. 7A relative to the film receiving surface.

When the coating film transfer tool A is used in the state shown in FIG. 7A, the arrangement of the button 13 on the upper side allows a finger pressing the button 13 to apply pressure to the transfer head 25. Therefore, the pressure applied to the transfer head 25 easily becomes stable.

A front end of the coating film transfer tool A is defined as a leading end transfer head 25 a situation where the button 13 is in an all-the-way-down position, the all-the-way-down position being reached when the button is pressed all the way down into the external cassette 1. A fore-and-aft direction of the coating film transfer tool A is defined as the direction in which the transfer head 25 sticks out. In this case, a value obtained by dividing the distance between the front end and a middle point in the fore-and-aft direction of the button 13 in the situation where the button 13 is pressed all the way down into the external cassette 1 (see FIG. 6B) by the full length in the fore-and-aft direction of the coating film transfer tool (see FIG. 6B) is represented by R. In this case, R is preferably not more than 0.35, more preferably not more than 0.3.

In the coating film transfer tool A, as described above, only when the button 13 is being pressed, the transfer head 25 sticks out of the external cassette 1. Therefore, only when the button 13 is being pressed, the coating film can be transferred to the film receiving surface. Meanwhile, the button 13 is provided on the upper side of the coating film transfer tool A, assuming that a downward direction of the coating film transfer tool A is defined as the pressing direction in the pressing position. Therefore, the direction in which the button is pressed coincides with the direction in which the coating film transfer tool A is held. In addition, pressure is easily applied to the transfer head 25 using a finger pressing the button. In the coating film transfer tool A, R is not more than 0.35. Therefore, the finger pressing the button holds the coating film transfer tool in the vicinity of the transfer head 25, and therefore, pressure intended by a user can be stably applied to the transfer head 25.

Thus, in the coating film transfer tool A, due to the provision of the button 13, the transfer head 25 does not stick out unless the coating film transfer tool A is pressed at the position in the vicinity of the transfer head 25 where it is easy to apply pressure to the transfer head 25, in a direction in which the coating film transfer tool A is held. Therefore, even a user who has never used the tool and does not well know how to use the tool, when transferring the coating film, does not hold a position where it is difficult to stabilize pressure applied to the transfer head, namely a position distant from the transfer head. In addition, even such a user, when transferring the coating film, does not place a finger only at a position where it is difficult to apply pressure to the transfer head. Therefore, even a user who has never used the tool and does not well know how to use the tool inevitably holds the coating film transfer tool in an optimum way for transferring the coating film. Therefore, the coating film transfer tool A can be used to transfer the coating film in a way intended by a user without bends or breaks in the transferred coating film.

When the coating film transfer tool A is not in use, the transfer head 25 is always housed in the external cassette 1. Therefore, when the coating film transfer tool A is not in use, the coating film on the transfer head 25 is protected from damage and foreign matter that could otherwise adhere thereto.

EXAMPLES

A coating film transfer tool A1 was prepared that is the coating film transfer tool shown in FIGS. 6A and 6B, a value R of which was 0.3, where R represents a value obtained by dividing the distance between the middle point of the button 13 and the leading end of the transfer head by the full length of the coating film transfer tool A of FIG. 6B. The internal cassette of the coating film transfer tool A1 housed transfer tape that had a width of 5 mm and the entire surface of which was coated with a correction coating film.

Next, a coating film transfer tool A2 was prepared. The coating film transfer tool A2 included the same internal cassette as that of the coating film transfer tool A1. The outer shape of the coating film transfer tool A2 before the button 13 of the external cassette 1 was pressed was similar to that of the coating film transfer tool A1. The position of the pivot hole 1322 of the button 13, and the extent to which the transfer head 25 stuck out when the button 13 was pressed, were similar between the coating film transfer tools A1 and A2. In the coating film transfer tool A2, R was adjusted to 0.35 by changing the full length of the button 13.

In addition, a coating film transfer tool B1 was prepared. As with the coating film transfer tool A2, the coating film transfer tool B1 included the same internal cassette as that of the coating film transfer tool A1. The outer shape of the coating film transfer tool B1 before the button 13 of the external cassette 1 was pressed was similar to that of the coating film transfer tool A1. The position of the pivot hole 1322 of the button 13, and the extent to which the transfer head 25 stuck out when the button 13 was pressed, were similar between the coating film transfer tools A1 and B1. In the coating film transfer tool B1, R was adjusted to 0.4 by changing the full length of the button 13.

Finally, a coating film transfer tool B2 was prepared. The coating film transfer tool B2 included the same internal cassette as that of the coating film transfer tool A1. The outer shape of the external cassette of the coating film transfer tool B2 was similar to that of the coating film transfer tool A1 before the button was pressed, but the button 13 was not allowed to be pushed into the inside even when the button 13 was pressed. The transfer head kept sticking out from the beginning.

Ten subjects who had never used a coating film transfer tool participated in testing. Five of the ten subjects participated in a transfer test in which the coating film transfer tools B2, B1, A2, and A1 were used in that order. The other five subjects participated in another transfer test in which the coating film transfer tools A1, A2, B1, and B2 were used in that order. It was explained to the subjects only that none of the coating film transfer tools B1, A2, and A1 cannot transfer the coating film unless the button is being pressed, that the coating film transfer tools B1, A2, and A1 can transfer the coating film by the transfer head being moved while being pressed, and in which direction the coating film transfer tools B1, A2, and A1 should be moved in order to transfer the coating film. The way of holding the coating film transfer tools was not explained at all.

Initially the subjects used a coating film transfer tool that was first used to transfer an arbitrary number of times (about two times) and thereby understood the way of transferring the coating film, before the transfer tests were conducted. A PPC sheet of the A4 size on which a rectangular frame of 6 mm wide×200 mm was printed was prepared. Each subject was instructed to transfer the coating film to the frame, continuously from end to end, without the coating film departing from the frame. The transfer tests were thus conducted.

The results of the transfer tests are shown in Table 1. The test results were evaluated in terms of how straight the transferred coating film was (whether or not the transferred coating film departed from the frame) and how continuous the transferred coating film was. As to how straight the transferred coating film was, the transferred coating film was rated "3" when there was no departure from the frame, "2" when there were not more than two departures from the frame having a length of less than 10 mm, and "1" when there was a departure from the frame having a length of not less than 10 mm, or there were not less than three departures from the frame having a length of less than 10 mm. As to how continuous the transferred coating film was, the transferred coating film was rated "3" when there was no break, "2" when there were not more than two breaks, and "1" when there were not less than three breaks.

TABLE 1

| Evaluated properties | Coating film transfer tools | Subject 1 | Subject 2 | Subject 3 | Subject 4 | Subject 5 | Subject 6 | Subject 7 | Subject 8 | Subject 9 | Subject 10 | Average |
|---|---|---|---|---|---|---|---|---|---|---|---|---|
| How straight a transferred coating film is | A1 | 3 | 3 | 2 | 3 | 3 | 3 | 3 | 2 | 3 | 2 | 2.7 |
| | A2 | 3 | 3 | 2 | 3 | 3 | 2 | 2 | 2 | 2 | 2 | 2.4 |
| | B1 | 2 | 2 | 1 | 1 | 2 | 2 | 2 | 2 | 1 | 1 | 1.6 |
| | B2 | 2 | 2 | 1 | 1 | 1 | 2 | 2 | 2 | 1 | 1 | 1.5 |
| How continuous a transferred coating film is | A1 | 3 | 2 | 2 | 3 | 3 | 3 | 3 | 2 | 3 | 3 | 2.7 |
| | A2 | 2 | 2 | 3 | 2 | 2 | 3 | 3 | 2 | 3 | 2 | 2.4 |
| | B1 | 2 | 1 | 2 | 1 | 1 | 2 | 2 | 2 | 2 | 2 | 1.7 |
| | B2 | 2 | 2 | 2 | 1 | 1 | 2 | 2 | 2 | 2 | 2 | 1.8 |

LIST OF REFERENCE NUMERALS

A: coating film transfer tool
T: transfer tape
T1: substrate tape
1: external cassette
11: case
111: guide groove 113: pivot shaft
114: spring bearing shaft
12: cover
121, 122: guide groove
123: pivot shaft
13: button
131: press plate
132: guide plate
1321: guide hole
1322: pivot hole
1323: press rib
1324: stopper rib
1325: cut portion
14: torsion spring
2: internal cassette
21: inner case
211, 212, 213: movement shaft
214: engagement groove
22: rarer cover
222, 223: movement shaft
224: engagement groove
23: supply core
231: pulley portion
24: take-up core
241: pulley portion
25: transfer head
26: O-ring

The invention claimed is:

1. A coating film transfer tool comprising an external cassette and an internal cassette housed in the external cassette, wherein
the internal cassette includes
a supply portion configured to supply transfer tape having a coating film on substrate tape,
a pressing and transferring portion configured to transfer the coating film to a film receiving surface by pressing the transfer tape against the film receiving surface,
a take-up portion configured to take up the substrate tape after the coating film is transferred, and
a rotation-in-conjunction mechanism configured to rotate the supply portion and the take-up portion in conjunction with each other,
the external cassette includes a button and an elastic member,
the pressing and transferring portion sticks out of the external cassette by the button being pressed and moved into the external cassette, and the pressing and transferring portion retracts into the external cassette due to an action of the elastic member by the pressing of the button being stopped,
the button is provided on an upper surface of the coating film transfer tool, where a downward direction of the coating film transfer tool is defined as a pressing direction of the coating film transfer tool in such a pressing position that the pressing and transferring portion is pressed against the film receiving surface in order to transfer the coating film,
in a case that a fore-and-aft direction of the coating film transfer tool is defined as a direction in which the pressing and transferring portion sticks out, and a front end of the coating film transfer tool is defined as a leading end of the pressing and transferring portion in a situation where the button is in an all-the-way-down position, the all-the-way-down position being reached when the button is pressed all the way down into the external cassette, a value obtained by dividing a distance between the front end and a middle point in the fore-and-aft direction of the button in the all-the-way-down position by a full length in the fore-and-aft direction of the coating film transfer tool is not more than 0.35,
the coating film transfer tool further comprises an external force action reduction portion configured to reduce an action on the button of an external force that acts on the pressing and transferring portion and pushes the pressing and transferring portion back into the external cassette in the situation where the button is in the all-the-way-down position,
the external force action reduction portion includes an engagement portion provided in the button,
the engagement portion is engaged with the internal cassette when the button is pressed, and is disengaged from the internal cassette by an action of the elastic member when the pressing of the button is stopped, and
when the button is pressed, a movement shaft provided in the internal cassette is moved in an elongated hole provided in the button, or a movement shaft provided in the button is moved in an elongated hole provided in the internal cassette, and the internal cassette is thereby moved in the external cassette so that the pressing and transferring portion sticks out of the external cassette.

2. The coating film transfer tool according to claim 1, wherein
the external force action reduction portion further includes a shaft holding portion configured to engage with the movement shaft, and
the shaft holding portion includes a cut portion, and the cut portion extends from the elongated hole in a direction in which the cut portion is engaged with the movement shaft by an external force that pushes the pressing and transferring portion back into the external cassette when the button is in the all-the-way-down position.

* * * * *